US010679144B2

(12) United States Patent
Fink et al.

(10) Patent No.: US 10,679,144 B2
(45) Date of Patent: Jun. 9, 2020

(54) GENERATING TRAINING DATA FOR MACHINE LEARNING

(71) Applicant: International Business Machines Corporation, Armonk, NY (US)

(72) Inventors: Patrick W. Fink, Charlotte, NC (US);
Kristin E. McNeil, Charlotte, NC (US);
Philip E. Parker, York, SC (US);
David B. Werts, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 15/207,918

(22) Filed: Jul. 12, 2016

(65) Prior Publication Data

US 2018/0018577 A1  Jan. 18, 2018

(51) Int. Cl.
*G06N 20/00* (2019.01)
*G06N 5/02* (2006.01)
*G06F 40/242* (2020.01)

(52) U.S. Cl.
CPC ........... *G06N 20/00* (2019.01); *G06F 40/242* (2020.01); *G06N 5/022* (2013.01)

(58) Field of Classification Search
CPC ..... G06N 20/00; G06F 17/27–17/2795; G06F 17/2735
See application file for complete search history.

(56) References Cited

U.S. PATENT DOCUMENTS

| 8,458,520 | B2 | 6/2013 | Lee et al. |
| 10,339,453 | B2 * | 7/2019 | Balani ..................... G06N 5/025 |
| 2007/0143284 | A1 | 6/2007 | Lee et al. |

(Continued)

FOREIGN PATENT DOCUMENTS

| WO | 2014035539 A1 | 3/2014 |
| WO | 2014071330 A2 | 5/2014 |
| WO | 2014144306 A1 | 9/2014 |

OTHER PUBLICATIONS

Kovacevic et al., "Combining rules and machine learning for extraction of temporal expressions and events from clinical narratives", Journal of the American Medical Informatics Association 2013, 20:859-866, Published Online First Apr. 20, 2013, doi:10.1136/amiajnl-2013-001625, pp. 859-866.

(Continued)

*Primary Examiner* — Stanley K. Hill
(74) *Attorney, Agent, or Firm* — Isaac J. Gooshaw

(57) ABSTRACT

A computer-implemented method includes receiving a rule, wherein the rule includes at least one token, and receiving at least two dictionaries, wherein the at least two dictionaries include at least one general language dictionary and at least one domain-specific dictionary for a domain. The computer-implemented method further includes, for each of the at least one token, selecting at least one word at random from at least one of the at least two dictionaries and adding the at least one word to a test data line, such that the test data line includes a candidate statement conforming to the rule. The computer-implemented method further includes filtering the candidate statement based on a domain-specific model for the domain and including the candidate statement in training data provided to a machine learning model. A corresponding computer program product and computer system are also disclosed.

20 Claims, 3 Drawing Sheets

(56) References Cited

U.S. PATENT DOCUMENTS

| | | |
|---|---|---|
| 2008/0243905 A1 | 10/2008 | Pavlov et al. |
| 2009/0094177 A1 | 4/2009 | Aoki |
| 2014/0321737 A1 | 10/2014 | Movellan et al. |
| 2014/0351229 A1 | 11/2014 | Gupta |
| 2015/0199609 A1 | 7/2015 | Rao et al. |
| 2018/0300315 A1* | 10/2018 | Leal ..................... G06F 16/355 |

OTHER PUBLICATIONS

Lee et al., "Deterministic Coreference Resolution Based on Entity-Centric, Precision-Ranked Rules", Computational Linguisticsm, vol. 39, No. 4, Accepted for publication: Nov. 20, 2012, doi:10.1162/COLI a 00152, © 2013 Association for Computational Linguistics, pp. 885-916.

IBM Appendix P, "List of IBM Patents or Patent Applications to be Treated as Related", dated Jul. 17, 2017, 2 pages.

Fink et al., "Generating Training Data for Machine Learning", U.S. Appl. No. 15/651,064, filed Jul. 17, 2017, pp. 1-17.

* cited by examiner

GENERATING TRAINING DATA FOR MACHINE LEARNING

BACKGROUND

The present invention relates generally to the field of machine learning, and more particularly to generating training data for classifiers and other machine learning modules.

In recent years, machine learning has come to dominate numerous fields of computer problem solving. In particular, machine learning modules have been successful in gleaning knowledge from voluminous unstructured natural language data, such as rich corpora of scientific, technical, and medical texts. Such rich data is not always available. For example, in such fields as medical diagnosis and financial fraud detection, patient records and customer financial records may be highly restricted, both in terms of access to the data and permissible uses of the data. That is, data science providers may have no ability to accesses sufficient data to train classifiers or other machine learning models, or, if they do, the authorized uses of the data may be insufficient for training classifiers well. Accordingly, data scientists continue to face challenges in obtaining sufficient training corpora for machine learning products of all kinds.

SUMMARY

A computer-implemented method includes receiving a rule, wherein the rule includes at least one token, and receiving at least two dictionaries, wherein the at least two dictionaries include at least one general language dictionary and at least one domain-specific dictionary for a domain. The computer-implemented method further includes, for each of the at least one token, selecting at least one word at random from at least one of the at least two dictionaries and adding the at least one word to a test data line, such that the test data line includes a candidate statement conforming to the rule. The computer-implemented method further includes filtering the candidate statement based on a domain-specific model for the domain and including the candidate statement in training data provided to a machine learning model. A corresponding computer program product and computer system are also disclosed. Such a method according to the invention is advantaged at least in that it provides for generating training data for machine learning where only limited or no training data is available.

In an aspect, the computer-implemented method further includes inserting at least one additional word randomly selected from at least one of the at least two dictionaries into the test data line. A method according to this aspect is advantaged at least in that it provides a robust corpus that includes varied positive test cases.

In an aspect, filtering the candidate statement includes discarding the candidate statement, if the candidate statement is nonsensical for the domain, according to the domain-specific model. A method according to this aspect is advantaged at least in that it provides trimming the generated training set based on valid combinations of domain-specific words.

DETAILED DESCRIPTION

Figure 1:
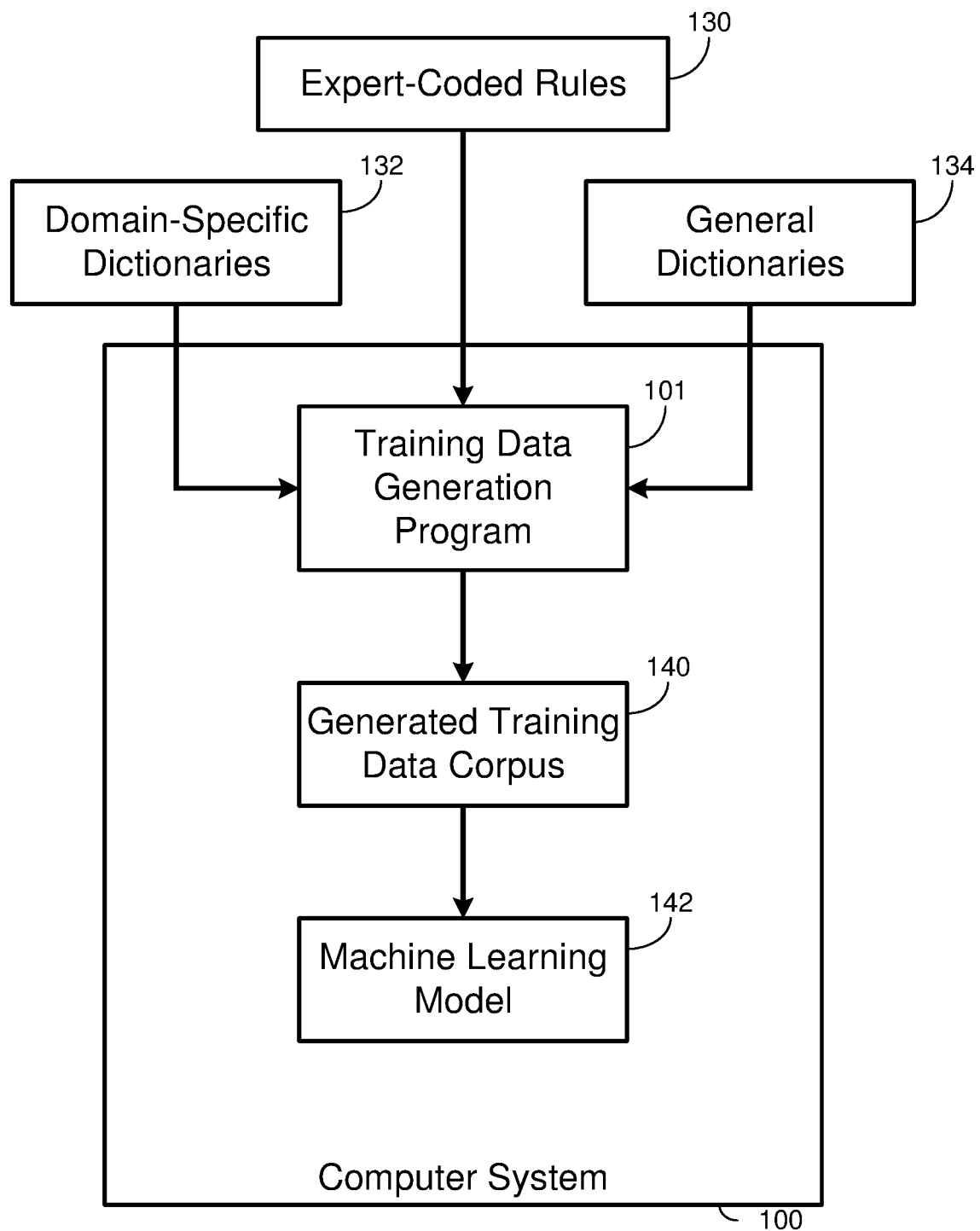
FIG. 1 is a block diagram depicting an operating environment for a training data generation program, in accordance with at least one embodiment of the invention.

Referring now to the invention in more detail, the invention is directed to a method and for transference of rule-based analytics knowledge into machine analytics systems. Equivalently, the invention may be understood as including creating data sets for machine learning based natural language processing models from a rule based engine with the rules being hand-coded by a subject matter expert in the domain of the specific natural language processing task. The inventors have observed and/or recognized that existing machine learning systems applied to problems in natural language processing require vast amounts of data to achieve sufficient accuracy levels. The inventors have further observed and/or recognized that hand-coded systems (i.e., knowledge engineered systems, particularly narrow knowledge engineered systems with few semantic rules) can achieve high accuracy with small training data sets (or even no preexisting or non-generated data at all), but the complexity of creating additional rules grows exponentially. That is, each hand-coded rule must be prepared by a human.

The inventors have further observed and/or recognized that embodiments of the invention combine the capture of human knowledge in rule form, which results in a fidelity loss (the rules are necessarily less specific than the knowledge that the rules generalize from). Simultaneously with such fidelity loss, embodiments of the invention rely upon the lexical properties of certain domains, wherein the domain-specific terminology (for example, at the level of individual words or phrases) differs significantly from the general language surrounding the domain-specific language. By applying the fidelity loss inherent in encoding knowledge as rules with the learnable distinctions inherent in domain-specific terminology, embodiments of the invention generate valuable training data that from which a learner can learn the expert knowledge without overfitting.

The inventors have further observed and/or recognized that a system that exhibits both the initial accuracy afforded by hand coded knowledge and the higher accuracy derived from machine learning systems would be an advancement of the art. The present invention is therefore directed to a method that uses hand-coded rules sets and/or systems to generate large amounts of training data (i.e., a large text corpus) for a machine learning natural language processor system. In embodiments of the present invention, the machine learning model uses statistical methods based on information extracted from rules created by subject matter experts, for example in the domain specific field, such as medical diagnosis. The inventors have observed, by experimentation, that embodiments of the present invention can achieve near-human levels of accuracy, initially, in a minimally trained production system while improving over time to reach eventual very high accuracy. It will be understood, however, that the aforementioned problems with the prior art and/or advantages of the invention are recited by way of example and not by way of limitation; accordingly, no particular embodiment need necessarily exhibit any particular recited possible advantage.

Figure 3:
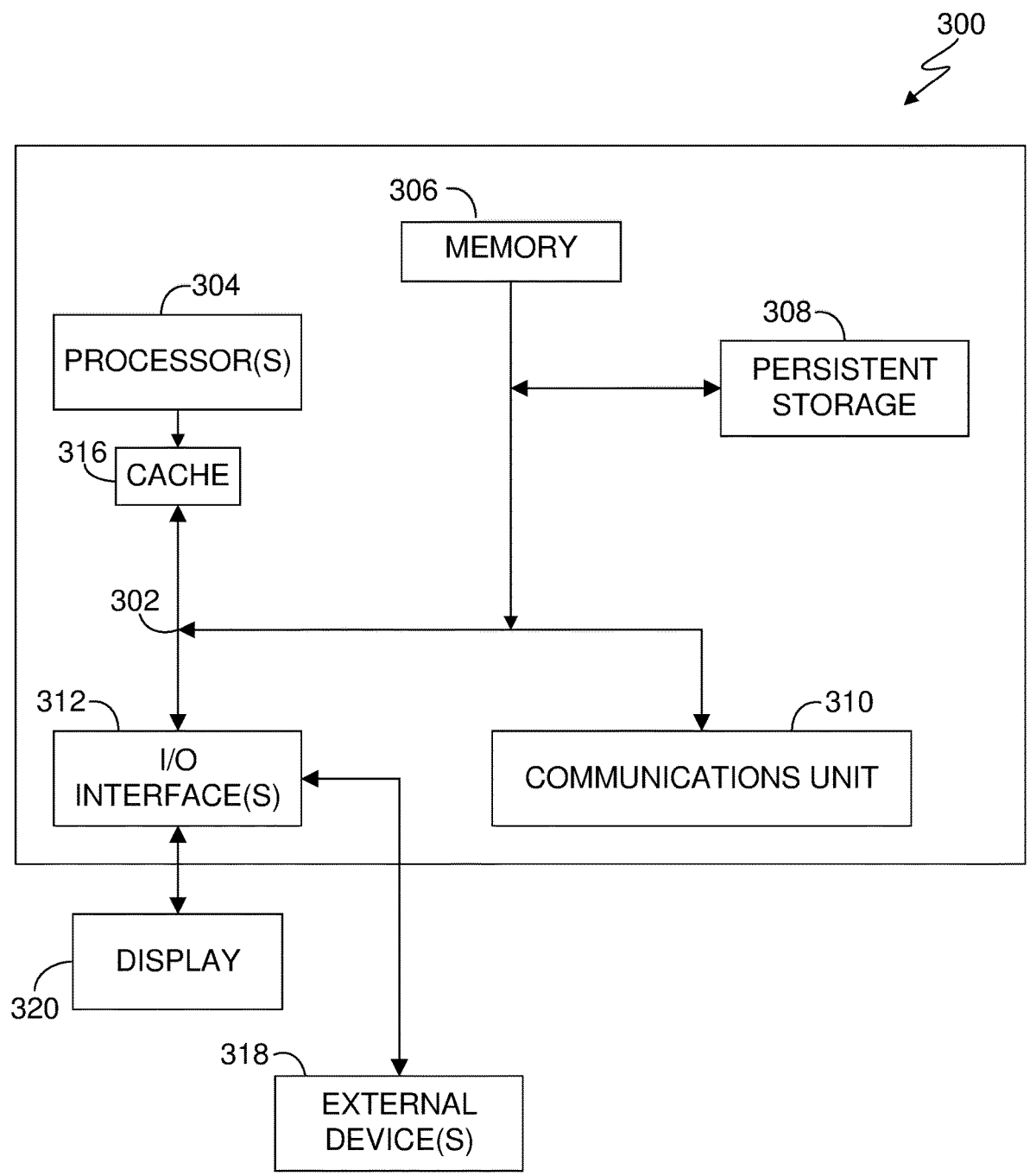
FIG. 3 is a block diagram depicting various logical elements for a computer system capable of executing program instructions, in accordance with at least one embodiment of the present invention.

FIG. 1 is a functional block diagram illustrating a computer system 100, which may be similar to the computer system of FIG. 3. More generally, the computer system 100 may include any physical or virtual computer, any desktop, laptop, server, mobile device, or any cloud-based environment. The training data generation program 101 operates within the environment provided by the computer system 100. The training data generation program 101 outputs a generated training data corpus 140, which can include many candidate statements in various lists. The training data generation program 101 presents the generated training data corpus 140 to the machine learning model 142; equivalently, the machine learning model 142 may be understood as trained on, based on, learning from the generated training corpus 140. Each candidate statement may be generated according an expert-coded rule 130, and many expert-coded rules 130 may be provided to generate varied domain-specific candidate statements. The expert-coded rules 130 may be provided to the training data generation program 101 as input. Input to the training data generation program 101 may also include general dictionaries 134 and domain-specific dictionaries 132. As used herein, a dictionary includes a list of words that are taken by the training data generation program 101 to be semantically used in the same way, for example the same part of speech or words designating names for things in the same category.

Figure 2:
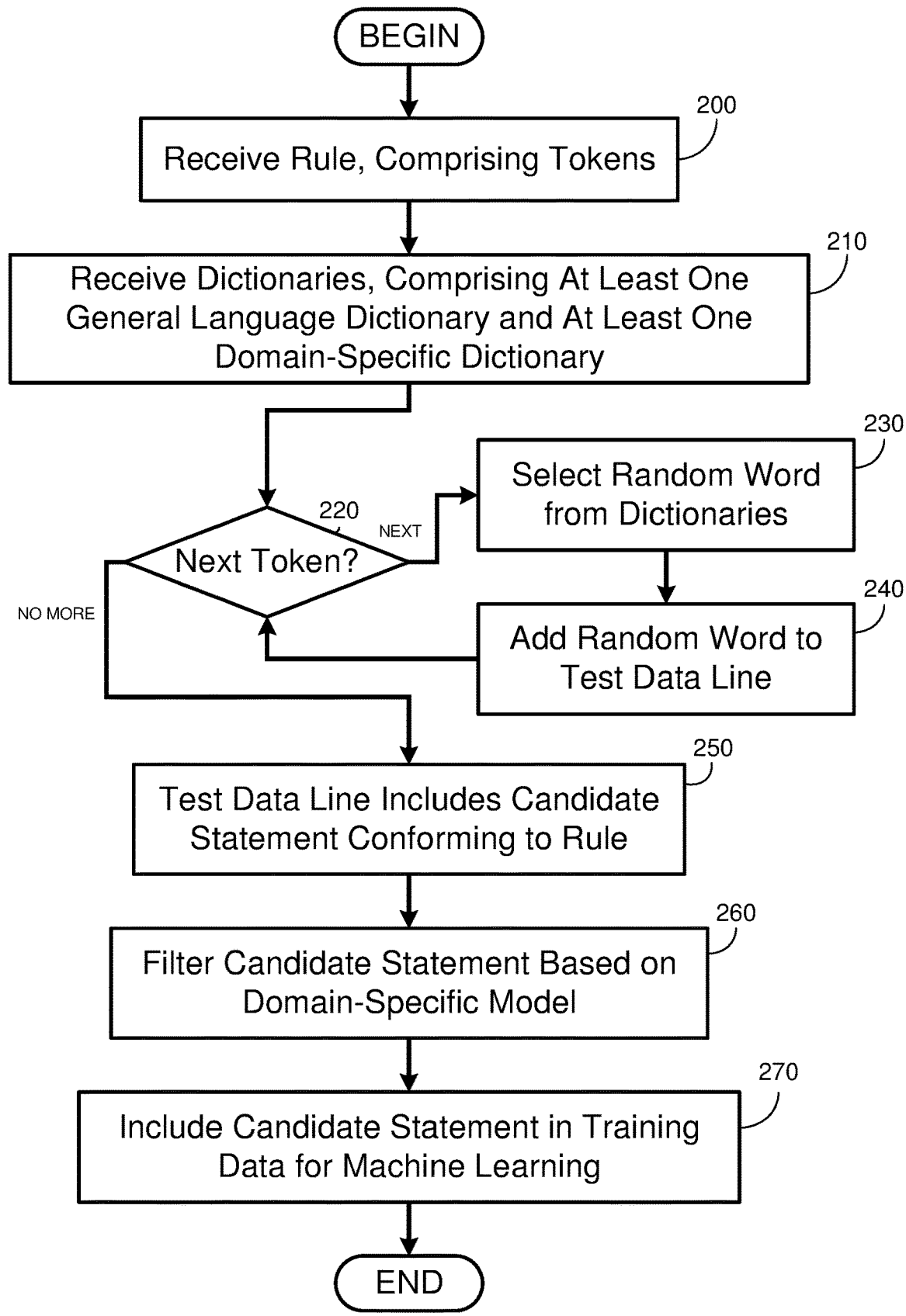
FIG. 2 is a flowchart diagram for a training data generation program, in accordance with at least one embodiment of the invention.

Referring now to FIG. 2, FIG. 2 is a flowchart diagram for a training data generation program 101, in accordance with at least one embodiment of the invention. At step 200, the training data generation program 101 receives a rule, for example one of the expert-coded rules 130. Thus, aspects of the invention may be understood as bringing engineered knowledge of a human expert into the machine learning process by encoding such knowledge in the rule. In the depicted embodiment, the rule includes at least one token. The rule may be encoded at the character level, word level, phrase level, sentence level, or paragraph level. Each token represents a set of characters, words, or other units that may validly follow from the one preceding. The token may represent a dictionary, part of speech, or list of sub-tokens. The tokens may be described using regular expressions or similar text-matching language.

At step 210, the training data generation program receives at least two dictionaries. The at least two dictionaries comprise at least one general language dictionary (e.g., general dictionaries 134) and at least one domain-specific dictionary for a given domain (e.g., domain-specific dictionaries 132). The given domain is that domain for which training data is being generated. Examples of general language dictionaries include lists of animal names, color words, names of household objects, names for foods, verbs relating to sports, etc. General language dictionaries can include parts of speech, for example lists of all or context-appropriate prepositions, pronouns, conjunctions, demonstrative adjectives, adverbs of frequency, etc. Domain-specific dictionaries 132 may include lists of technical terms or words having subject-specific definitions. In the domain of medical diagnosis, domain specific dictionaries can include diagnoses (e.g., names of infections, injuries, or other conditions) as well as symptoms (e.g., headache, fever, shortness of breath, etc.).

Referring still to the embodiment depicted in FIG. 2, at decision block 220, the training data generation program 101 processes each token of the rule. For each of token, at step 230 (decision block 220, NEXT branch), the training data generation program selects at least one word at random from at least one of the dictionaries and, at step 240, adds the word to a test data line. Test data line may be a text string that begins empty and is filled by the training data generation program 101. Multiple test data lines may be combined into a large data structure, such as a list or array of text strings, prior to output. Because the dictionary or other word set is dictated by the token being processed, the word chosen at random can be guaranteed to be semantically valid (i.e., grammatical, according the rule) for the words that preceded it. Multiple words may be introduced. For example, where a rule specifies an unbounded, comma separated list of words from the same dictionary, a random number of such words may be introduced. When all tokens of the rule are processed (decision block 220, NO MORE branch), then, at step 250, the training data generation program 101 may be understood to have yielded a candidate statement that conforms to the rule. At any step iterating over the tokens, in some embodiments, the training data generation program 101 may insert at least one additional word randomly selected from at least one of the at least two dictionaries into the test line. Such random insertions must comply with the rule, in terms of the dictionary selected, but can serve to vary the length and complexity of the training set, which provides robustness and avoids overfitting. Thus, by randomly selecting words from dictionaries at various points in the method, embodiments of the invention may be understood to provide stochastically generated sentences.

Referring still to the embodiment depicted in FIG. 2, at step 260, the training data generation program 101 filters the candidate statement based on a domain-specific model for the domain. Specifically, the domain-specific model may be understood and/or expressed, in some embodiments, as a state machine that embodies the knowledge of what statements will be sensical vs. nonsensical of all semantically correct candidate statements. For example, in the domain of medical diagnosis, the statement "back pain is a symptom of hair loss" is nonsensical, even if semantically correct. Such a statement may be filtered by the training data generation program 101 applying the model and discarding statements that do not conform to the model. In some embodiments, the filtering of step 260 may be omitted; such embodiments may be desirable where a purely stochastically generated data set is desirable for engineering considerations.

The domain-specific model may be developed by subject matter experts in the domain, with or without the assistance of machine learning. The domain-specific model may be based on a domain-specific corpus, for example by similarity scoring candidate statements for similarity with statements in the corpus. The domain-specific model may also be expressed as an n-gram. For example, for a given sequence of words, phrases, characters, or sentences, the model may predict, for the domain-specific corpus, the most likely next element. In such embodiments, the training data generation program 101 may score the candidate statement based on its adherence, at one or more positions in the n-gram, to probable elements for the corpus.

The corpus upon which the domain-specific model is based may be a general corpus within the domain. For example, if the domain is medical diagnosis, then the corpus may comprise medical textbooks, research papers, and journal articles (i.e., a general medical corpus). If the domain is food recipes, then the corpus may include cookbooks, food articles, and restaurant reviews. Various embodiments of the invention may specifically exclude user-specific information from the corpus, for example due to restrictions on the use of or difficulty in collecting such information. In medical diagnosis, medical patient records may be excluded because such records may not be available to engineers and, even if available, such records may be subject to legal and regulatory use restrictions that prevent such data from being applied to train machine learning. Accordingly, the training data generation program 101 may rely on rules to create its candidate statements while filtering based on the corpus, rather than relying on the corpus directly, in order to generate sufficient training data. For embodiments where the domain is medical diagnosis, the domain-specific model may take the form of an n-gram model of medical diagnosis statements, based on the corpus.

Referring still to the embodiment depicted in FIG. 2, at step 270, the training data generation program 101 includes the candidate statement in training data for a machine learning model. The machine learning model can include any supervised or unsupervised trainable model now known or later discovered. Examples of trainable models include neural nets, perceptrons, support vector machines, semantic engines, induction systems, genetic algorithms, and Bayesian networks. Data generated by embodiments of the present invention may be applied for verification data as well as training data, for models where verification data is used.

In some embodiments, supervised machine learning may be modified to better consume the generated sentences/statements to achieve higher model accuracy. Specifically, embodiments of the invention include modifying a log-sum-square function in the first phase of supervised machine learning to proportionally penalize sentences that use more stochastically selected general language terms. That is, the more a statement uses the inserted random words, then the more it can be downweighted. Such an embodiment is believed by the inventors to assist the machine learning model in avoiding overfitting data generated by the training data generation program 101. Such an approach is also believed by the inventors to tend to favor more stringent human-captured rules, because such rules would have less reliance upon stochastic words than more lax human-captured rules.

FIG. 3 is a block diagram depicting components of a computer 300 suitable for executing the training data generation program 101. FIG. 3 displays the computer 300, the one or more processor(s) 304 (including one or more computer processors), the communications fabric 302, the memory 306, the RAM, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the training data generation program 101 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. training data generation program 101 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising one or more computer readable storage media and program instructions stored on said one or more computer readable storage media, said program instructions comprising instructions to:

receive a rule, wherein said rule comprises at least one token;

receive at least two dictionaries, wherein said at least two dictionaries comprise at least one general language dictionary and at least one domain-specific dictionary for a domain;

for each of said at least one token, select at least one word at random from at least one of said at least two dictionaries and add said at least one word to a test data line, such that said test data line comprises a candidate statement conforming to said rule;

filter said candidate statement based on a domain-specific model for said domain; and include said candidate statement in training data provided to a machine learning model.

2. The computer program product of claim 1, wherein said program instructions further comprise instructions to insert at least one additional word randomly selected from at least one of said at least two dictionaries into said test data line.

3. The computer program product of claim 1, wherein said instructions to filter said candidate statement comprise instructions to discard said candidate statement, if said candidate statement fails to meet a definition of semantically correct candidate statements for said domain, according to said domain-specific model.

4. The computer program product of claim 3, wherein said domain-specific model is based on a general corpus within said domain.

5. The computer program product of claim 1, wherein said rule is expressed using regular expressions.

6. The computer program product of claim 1, wherein said rule is expressed as a state machine.

7. The computer program product of claim 1, wherein said rule encodes engineered knowledge of a human expert.

8. A computer system comprising:
one or more processors;
one or more computer readable storage media;
computer program instructions;
said computer program instructions being stored on said one or more computer readable storage media;
said computer program instructions comprising instructions to:
receive a rule, wherein said rule comprises at least one token;
receive at least two dictionaries, wherein said at least two dictionaries comprise at least one general language dictionary and at least one domain-specific dictionary for a domain;
for each of said at least one token, select at least one word at random from at least one of said at least two dictionaries and add said at least one word to a test data line, such that said test data line comprises a candidate statement conforming to said rule;
filter said candidate statement based on a domain-specific model for said domain; and
include said candidate statement in training data provided to a machine learning model.

9. The computer system of claim 8, wherein said program instructions further comprise instructions to insert at least one additional word randomly selected from at least one of said at least two dictionaries into said test data line.

10. The computer system of claim 8, wherein said instructions to filter said candidate statement comprise instructions to discard said candidate statement, if said candidate statement fails to meet a definition of semantically correct candidate statements for said domain, according to said domain-specific model.

11. The computer system of claim 10, wherein said domain-specific model is based on a general corpus within said domain.

12. The computer system of claim 10, wherein said domain-specific model is based on a corpus that excludes user-specific information.

13. The computer system of claim 10, wherein said domain-specific model is an n-gram model of domain-specific statements.

14. The computer system of claim 10, wherein said domain is medical diagnosis.

15. The computer system of claim 14, wherein said domain-specific model is based on a general medical corpus.

16. The computer system of claim 14, wherein said domain-specific model is based on a corpus that excludes medical patient records.

17. The computer system of claim 14, wherein said domain-specific model is an n-gram model of medical diagnosis statements.

18. The computer system of claim 8, wherein said rule is expressed using regular expressions.

19. The computer system of claim 8, wherein said rule is expressed as a state machine.

20. The computer system of claim 8, wherein said rule encodes engineered knowledge of a human expert.

* * * * *